Figure 1:
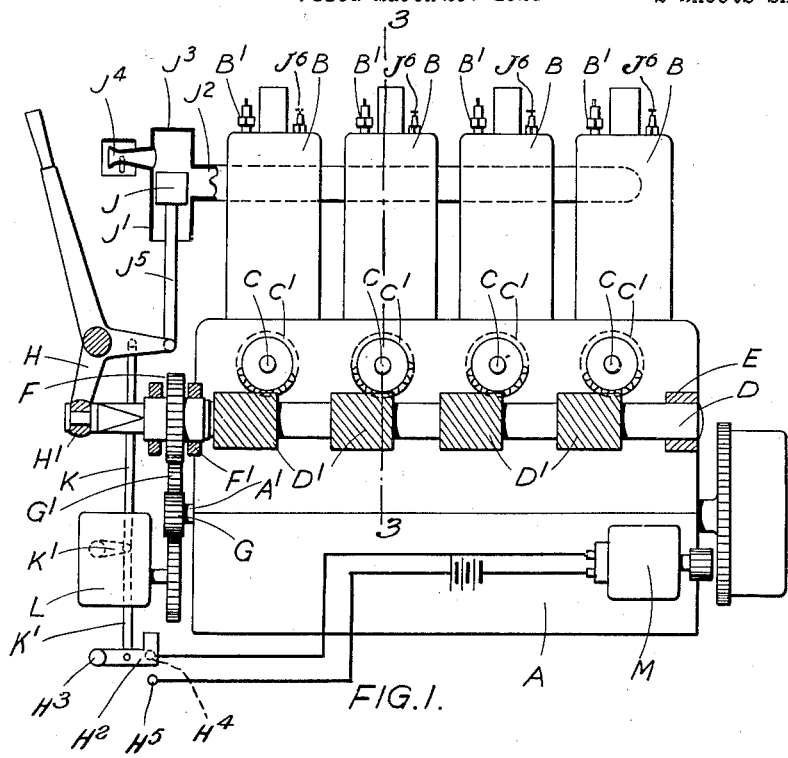

May 15, 1928.                                                                  1,669,780
H. R. RICARDO
MEANS FOR STARTING INTERNAL COMBUSTION ENGINES
Filed March 29, 1926                    2 Sheets-Sheet 1

INVENTOR
Harry R. Ricardo
By Watson, Coit, Morse & Grindle
ATTYS.

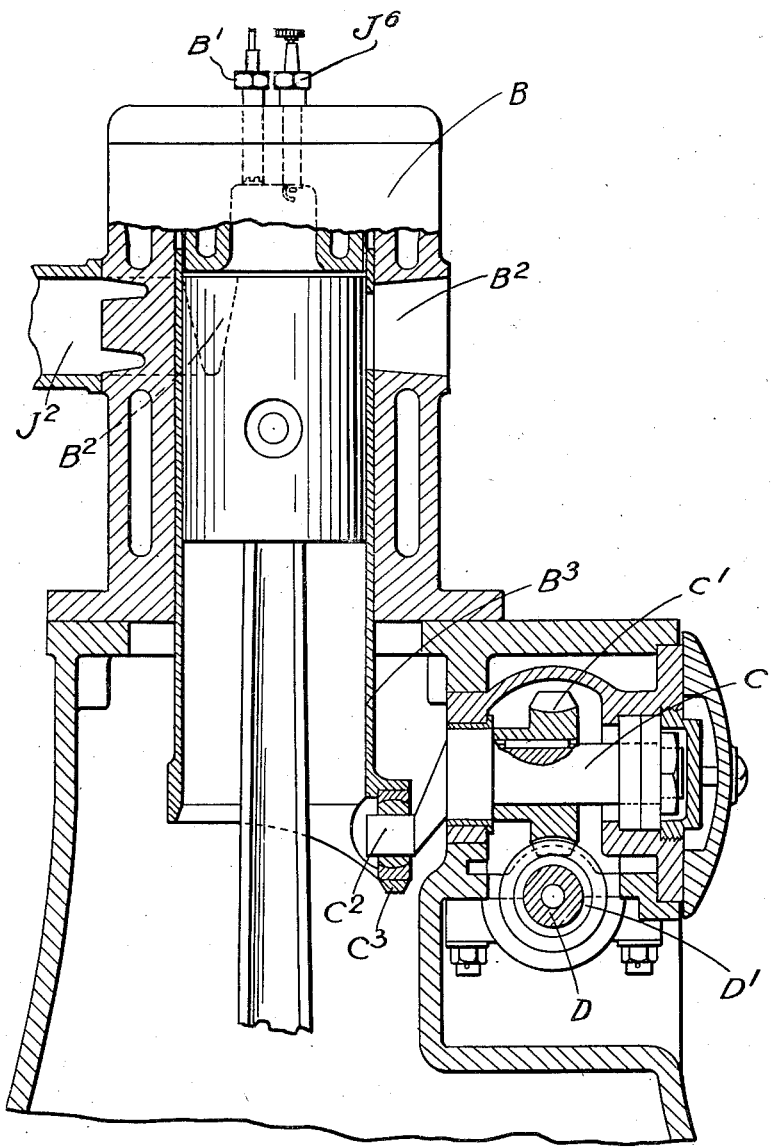

Patented May 15, 1928.

1,669,780

UNITED STATES PATENT OFFICE.

HARRY RALPH RICARDO, OF LONDON, ENGLAND.

MEANS FOR STARTING INTERNAL-COMBUSTION ENGINES.

Application filed March 29, 1926, Serial No. 98,356, and in Great Britain April 7, 1925.

This invention relates to sleeve valve internal combustion engines, more particularly those of the Diesel and other high compression types, and has for its object to facilitate the starting of such engines.

When starting high compression internal combustion engines such as Diesel engines, by mechanically rotating them without the use of compressed air, difficulty is experienced in turning the engine over the first few compression strokes since the flywheel has not then acquired sufficient momentum to even up appreciably the torque demand on the starting mechanism. If, however, a decompressor or some equivalent device is provided, this difficulty does not arise to such an extent and the engine can more easily be rotated until it reaches a speed at which the flywheel momentum is sufficient to overcome the compression resistance when the decompressor or equivalent device is cut out.

In poppet valve engines this decompression is easily effected by lifting and thus holding open either the inlet or the exhaust valve until the engine has gained sufficient speed but, in a sleeve valve engine, this is clearly impossible while the construction is generally such as to render undesirable the use of a special decompression valve.

According to one feature of the present invention means are provided for controlling the mechanism by which the sleeve valve is operated so as to enable the timing of such valve to be varied in relation to the crank shaft whereby the charge compressed within the cylinder on each compression stroke can be reduced when starting the engine. In this manner both the quantity of the charge actually compressed and the maximum compression pressure can be reduced to an extent sufficient to make the starting of the engine by mechanical rotation relatively easy.

The timing of the valve or valves may be so altered that the inlet port or ports are closed early in the suction stroke thus reducing the charge drawn into the cylinder. With such an arrangement, however, a cylinder in which the piston is initially at bottom dead centre will have acquired a full charge by leakage and it is preferable, therefore, in most cases to vary the valve timing so as to maintain the inlet port or ports open during a portion of the compression stroke so that a substantial part of the charge drawn into the cylinder on the suction stroke is expelled again and the maximum compression thus reduced.

The variation in the valve timing in order to reduce the maximum compression pressure is conveniently effected by altering the phase relationship between the sleeve valve or valves and the crank shaft in some suitable manner. For example, where each sleeve has motion imparted thereto both about and in the direction of its axis by means of a crank pin carried by a short shaft, this short shaft, which for the purposes of this specification will be termed the valve-operating crank shaft, may be driven from a lay shaft through skew or worm gearing the lay shaft in turn being driven by suitable gearing from the engine crank shaft. The alteration in the timing of the sleeve or sleeves in relation to the engine crank shaft is effected by moving the lay shaft or the skew or worm gears thereon longitudinally so as to rotate the valve-operating crank shafts independently of any rotation which may be imparted thereto by the rotation of the lay shaft.

Where the invention is applied to a multicylinder internal combustion engine, separate controlling means may be provided for varying the timing of the sleeve or sleeves of each cylinder or common control mechanism may be provided to vary the valve timing of all the cylinders simultaneously. Thus in the arrangement described above, a single longitudinally movable lay shaft may conveniently drive all the valve-operating crank shafts through skew or worm gearing.

In an alternative arrangement wherein each sleeve is operated by a lever which serves to transmit motion from an eccentric or crank on a lay shaft to the sleeve through a spherical joint or other flexible connection, means may be provided for altering the phase relationship between the lay shaft and the crank shaft so as simultaneously to alter the timing of all the valves in relation to the crank shaft. Thus, for example, the lay shaft may be driven from the crank shaft through skew gearing and means may be provided for moving two of the skew gears relatively to one another in a direction parallel to the axes of rotation of these gears so as to cause relative rotation between these skew gears independently of any rotation due to the rotation of the crank shaft, thus altering the phase relationship between the lay shaft and the crank shaft. One of the skew gears for effecting this change in phase is made of sufficient length to ensure proper engagement of the two gears throughout their relative movement.

The invention is particularly applicable to high compression liquid injection engines, such as Diesel engines, and according to a further feature of the present invention an interlocked or interconnection is preferably provided between the mechanism for varying the valve timing and that for cutting off the liquid fuel supply this interconnection being arranged so that fuel injection can only take place when the valve timing is such that the engine will operate at its normal running compression. In this way the risk of liquid fuel accumulating in the cylinder while the engine is running on reduced compression and subsequently exploding when the valve gear is moved to its full compression position is avoided and the operation of starting is simplified since the movement of the valve gear to its full compression position and the admission of the liquid fuel to the cylinders can both be carried out by a single control lever.

In certain cases, for example for the purpose of warming up a compression ignition engine such as a Diesel engine, according to a further feature of the present invention it may be desirable when starting to supply such engine with a gaseous combustible mixture and to retain and compress a part thereof in the cylinder, running the engine as a low compression engine with electric or similar ignition until the engine has attained the desired speed. To this end when starting a charge of combustible mixture may be supplied to the engine either through the main inlet port or ports or through one or more auxiliary ports the supply of this charge being cut off when the valve timing is altered to the normal running or high compression position. Preferably the means for cutting off the fuel supply and those for altering the valve timing are interconnected or interlocked so as to eliminate any risk of raising a gaseous combustible charge to the high normal running compression of the engine since this might result in a dangerous preignition. The engine may be started as a low compression engine either by hand or by some known means such as an electric starting motor.

In an engine according to this invention the control of the valve timing may be effected either by hand or automatically and where the operation is automatic, as for example by means of some form of governor, this is conveniently adapted to move the valve gear control from the "starting" to the "running" position either when the engine has attained a predetermined speed or when the electric or other starting engine is cut out.

Where the invention is applied to direct reversing engines, the present means for varying the valve timing in order to reduce the compression pressure may be combined with the previously proposed means for varying the valve timing in order to effect the reversal of the engine so that a single control mechanism will give starting and running valve timings both for forward and reverse running of the engine.

Further, where an electric motor or other source of power is employed to start the engine, the starting switch or other member for bringing such starting motor into operation may according to this invention be interconnected or interlocked with the mechanism for varying the valve timing, whether such mechanism is itself interconnected with means for controlling the liquid fuel supply to the cylinder or cylinders or the admission of a gaseous charge for starting purposes or not. This interconnection is conveniently such that the starting motor is thrown out of operation automatically when the valve gear control is moved to its normal running position while the starting motor cannot be put into operation while the valve gear control is in its normal running or high compression position.

Figure 2:
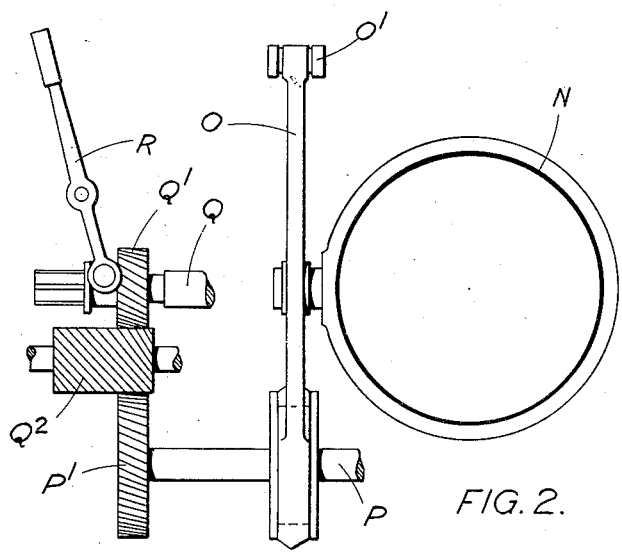

The invention may be carried out in various ways but two alternative constructions according to this invention are illustrated by way of example in the accompanying drawings, in which:

Figure 1 is a side elevation partially in section of a multi-cylinder sleeve valve engine according to this invention in which each sleeve is operated by a separate crank shaft driven through skew gearing from a common lay shaft, Figure 2 is a diagrammatic plan view showing how the invention may be applied to a sleeve valve engine in which all the sleeves are driven through suitably arranged levers from a common lay shaft; and Figure 3 is a section taken substantially on the line 3—3 of Fig. 1.

In the construction illustrated in Figure 1 the engine comprises a crank case A containing a crank shaft $A^1$ and having mounted thereon cylinders B provided with fuel injection nozzles $B^1$. Inlet and exhaust ports $B^2$ are provided in the wall of each cylinder and these ports are controlled in known manner by sleeve valves $B^3$ having motion imparted thereto both about and in the direction of their axes. Each sleeve valve is adapted to be operated by a separate shaft C disposed with its axis at right angles to the axis of the cylinder and carrying for example a crank pin $C^2$ which engages a spherical or other self aligning bearing $C^3$ in the sleeve. Each of the valve-operating shafts C has a skew gear or worm wheel $C^1$ rigidly mounted thereon and engaging respectively a second skew gear or a worm $D^1$ rigidly mounted on a lay shaft D which is conveniently disposed parallel with the crank shaft $A^1$ of the engine and is common to all the sleeve valves.

The lay shaft D is supported at one end in a bearing E and at the other end by a gear wheel F mounted in bearings $F^1$ and is capable of sliding through the gear wheel F but is held from rotation relatively thereto, for example by splines or the like. The lay shaft is adapted to be driven from the crank shaft $A^1$ by gearing comprising for example a gear wheel G on the crank shaft engaging an intermediate gear wheel $G^1$ meshing in turn with the gear wheel F and is adapted to be moved longitudinally carrying the skew gears or worms $D^1$ with it so as to rotate the valve-operating crank shafts C independently of the rotation imparted thereto by the rotation of the lay shaft D, the skew gears or worms $D^1$ on the lay shaft being of sufficient width to engage with their respective cooperating skew gears or worm wheels $C^1$ on the valve-operating shafts C throughout the longitudinal movement of the lay shaft D. The longitudinal movement of the lay shaft D is conveniently effected by means of a hand lever H operating on a thrust bearing $H^1$ on the lay shaft. This lever H may also control a valve through which either a gaseous combustible charge from a carburettor or pure air from the atmosphere can be admitted to the induction pipe of the engine according as the control lever is in its starting or its normal running position respectively.

In the arrangement diagrammatically illustrated in Figure 1 this valve comprises a piston J adapted to move in a cylinder $J^1$ communicating with the induction pipe or manifold $J^2$ of the engine. The upper end $J^3$ of the cylinder $J^1$ is closed and communicates with a petrol or like carburettor $J^4$ while the lower end is open to the atmosphere. The piston is adapted to be operated by a link $J^5$ connecting it to the lever H and the arrangement is such that when this lever is in the starting position so that the engine is operating on low compression, the induction pipe $J^2$ is placed in communication with the carburettor $J^4$ while when the lever H is in the normal running or full compression position the induction pipe is placed in communication with the atmosphere.

In this way the engine can if desired be started as a low compression engine running on the gaseous combustible charge from the carburettor, this charge being ignited by a sparking plug $J^6$ or similar means while, when the control lever H is moved from its starting to its normal running position, the gaseous combustible charge is automatically cut off and pure air is delivered to the engine.

The control lever H may also operate for example through a link K a by-pass or other control $K^1$ acting on the fuel pumps indicated at L or on the supply of liquid fuel to the cylinders so that the liquid fuel injection is automatically cut off when the control lever H is in the starting position, while a switch may also be actuated by the lever H to cut off the ignition current when running with high compression on liquid fuel. Further a switch $H^2$ controlling an electric motor such as that indicated at M which rotates the engine for starting purposes may be automatically switched off by the movement of the control lever H from the starting to the normal running position as shown.

The switch for the motor M conveniently comprises a switch arm $H^2$ pivoted at $H^3$ and adapted to be operated by an extension $K^1$ of the rod K so that it connects two contact points $H^4$, $H^5$, and thus closes the circuit of the motor M when the lever H is moved into its starting position and automatically opens this circuit when the lever H is moved into its normal running or high compression position.

In the alternative construction illustrated diagrammatically in Figure 2 the sleeve N is operated by a lever O one end of which is restrained by a link or the like $O^1$ while the other end engages an eccentric on a lay shaft P, an intermediate point in the lever engaging a spherical or other self aligning joint in the sleeve.

The lay shaft P from which in the case of a multi-cylinder engine all the sleeves may be operated, is driven from the engine crank shaft Q through gearing comprising a skew gear $Q^1$ mounted on the crank shaft Q so as to be movable along but not rotatable relatively to this shaft, this skew gear meshing with a relatively long skew gear $Q^2$ which in turn meshes with a skew gear $P^1$ rigidly mounted on the lay shaft. The phase relationship between the crank shaft and the lay shaft is varied in this construction by means of a control lever R which is adapted to move the skew gear $Q^1$ along its shaft relatively to the skew gear $Q^2$ and thus cause rotation of the skew gears $Q^2$ and $P^1$ and hence of the lay shaft independently of any rotation thereof due to the rotation of the crank shaft. Thus, in this arrangement, the actual change of relative positions takes place between the crank shaft and the lay shaft and not between the lay shaft and the valves as in the construction illustrated in Figure 1.

In the construction illustrated in Figure 2 the lever R may be connected to a valve for permitting a gaseous combustible charge from a carburettor or the like to be delivered to the engine when starting and interconnections between other controls and the lever R may be provided in a similar manner to the interconnection of controls with the lever H described with reference to the construction shown in Figure 1.

The axial movement of the lay shaft in the Figure 1 construction and the axial movement of the skew gear $Q^1$ in the Figure 2 construction is conveniently so proportioned as to retard the sleeve valve timing by about 90° in relation to the crank shaft angle when starting. Thus, if for high compression running the inlet port closes 30° after bottom dead centre giving a compression ratio of 15 to 1, then, for starting, the inlet port will close 120° late, or about three-quarters of the way up the compression stroke, giving an effective compression ratio of about 4.5 to 1. With this low effective compression ratio it is possible to rotate the engine either by hand or by means of a barring engine or motor of moderate size. On reaching a suitable speed the lay shaft D or skew gear $Q^1$ is moved axially into its normal running position giving a full charge and the effective compression ratio necessary for the operation of the engine as a compression ignition or Diesel type engine. Owing to the momentum of the flywheel the speed of the engine can be maintained in spite of the high compression pressure and the liquid fuel injection can be brought into operation when the engine will run on its normal or compression ignition cycle.

The operation of an engine according to this invention is conveniently as follows:—

For starting as a low compression engine employing a combustible charge the control lever H is placed in the starting position the fuel pumps being thereby cut off, the ignition switched on and the carburettor $J^4$ connected to the induction pipe $J^2$ as explained above. The engine is then turned over by hand or by the electric or other starting motor M and starts as a low compression engine employing a gaseous combustible charge. When a sufficient speed has been attained the control lever H or R is thrown over into the normal running position which, as set forth above, preferably simultaneously moves the valve-operating mechanism to its normal high compression or running position, cuts off the supply of gaseous combustible mixture from the carburettor M and admits pure air to the induction pipe $J^2$, switches off the ignition current and admits liquid fuel to the fuel injection sprayers $B^1$ thus enabling the engine to run as a high compression liquid injection unit in the ordinary manner.

When the invention is applied to a multi-cylinder internal combustion engine it may be found desirable in some cases to vary the timing of the valves or one or more of the cylinders only, the timing of the remaining valve or valves being maintained constant in relation to the crank shaft.

What I claim as my invention and desire to secure by Letters Patent is:—

1. In an internal combustion engine of the Diesel type the combination of a cylinder having inlet and exhaust ports therein, means for injecting a charge of liquid fuel into the cylinder, a sleeve valve disposed within the cylinder and adapted to control the ports therein, a crank shaft, mechanism actuated from the crank shaft for imparting a combined oscillating and reciprocating motion to the sleeve, means for controlling this mechanism so as to vary the timing of the sleeve in relation to the crank shaft whereby the charge compressed within the cylinder on each compression stroke can be reduced at starting, means for cutting off the liquid fuel supply, and an interconnection between the mechanism for varying the valve timing and that for cutting off the liquid fuel supply so arranged that fuel injection can only take place when the valve timing is such that the engine will operate at its normal running compression.

2. In an internal combustion engine of the Diesel type the combination of a cylinder having inlet and exhaust ports therein, a sleeve valve disposed within the cylinder and adapted to control these ports, means for injecting a charge of liquid fuel into the cylinder, a crank shaft, mechanism actuated from the crank shaft for operating the sleeve valve, means for controlling this mechanism so as to vary the timing of the sleeve in relation to the crank shaft whereby the charge compressed within the cylinder on each compression stroke can be reduced at starting, means for cutting off the liquid fuel supply, and an interconnection between the mechanism for varying the valve timing and that for cutting off the liquid fuel supply so arranged that fuel injection can only take place when the valve timing is such that the engine will operate at its normal running compression.

3. In an internal combustion engine of the Diesel type the combination of a cylinder having inlet and exhaust ports therein, means for injecting a charge of liquid fuel into the cylinder, a sleeve valve disposed within the cylinder and adapted to control the ports therein, a crank shaft, mechanism actuated from the crank shaft for imparting a combined oscillating and reciprocating motion to the sleeve, means for controlling this mechanism so as to vary the timing of the sleeve in relation to the crank shaft whereby the charge compressed within the cylinder on each compression stroke can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, means for supplying an explosive gaseous mixture to the cylinder when the mechanism controlling the valve timing is in its reduced compression position, and means for igniting this gaseous mixture.

4. In an internal combustion engine of the Diesel type the combination of a cylinder having inlet and exhaust ports therein, a sleeve valve disposed within the cylinder and adapted to control these ports, means for injecting a charge of liquid fuel into the cylinder, a crank shaft, mechanism actuated from the crank shaft for operating the sleeve valve, means for controlling this mechanism so as to vary the timing of the sleeve in relation to the crank shaft whereby the charge compressed within the cylinder can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, means for supplying an explosive gaseous mixture to the cylinder when the mechanism controlling the valve timing is in its reduced compression position, and means for igniting this mixture.

5. In an internal combustion engine of the Diesel type the combination of at least one cylinder having inlet and exhaust ports therein, a sleeve valve disposed within each cylinder and adapted to control the ports, means for injecting a charge of liquid fuel into the cylinder, a short crank shaft adjacent to each sleeve, a crank pin on each short shaft, a flexible connection between the crank pin and the sleeve whereby rotation of the short shaft imparts a combined oscillating and reciprocating motion to the sleeve, a skew gear on each short shaft, a lay shaft, a second skew gear on the lay shaft meshing with the skew gear on the short shaft, an engine crank shaft, an operative driving connection between the engine crank shaft and the lay shaft, means for moving the lay shaft in the direction of its length so as to vary the timing of each sleeve valve in relation to the crank shaft whereby the charge compressed within the cylinder on each compression stroke can be reduced, means for cutting off the liquid fuel supply, and an interconnection between the means for moving the lay shaft longitudinally and the means for cutting off the liquid fuel supply so arranged that fuel injection can only take place when the valve timing is such that the engine will operate at its normal working compression.

6. In an internal combustion engine of the Diesel type the combination of at least one cylinder having inlet and exhaust ports therein, a sleeve valve disposed within each cylinder and adapted to control the ports, means for injecting a charge of liquid fuel into the cylinder, a short crank shaft adjacent to each sleeve, a crank pin on each short shaft, a flexible connection between the crank pin and the sleeve whereby rotation of the short shaft imparts a combined oscillating and reciprocating motion to the sleeve, a skew gear on each short shaft, a lay shaft, a second skew gear on the lay shaft meshing with the skew gear on the short shaft, an engine crank shaft, an operative driving connection between the engine crank shaft and the lay shaft, means for moving the lay shaft in the direction of its length so as to vary the timing of each sleeve valve in relation to the crank shaft whereby the charge compressed within the cylinder on each compression stroke can be reduced, means for cutting off the liquid fuel supply, an interconnection between the means for moving the lay shaft longitudinally and the means for cutting off the liquid fuel supply so arranged that fuel injection can only take place when the valve timing is such that the engine will operate at its normal working compression, means for supplying a gaseous explosive charge to the cylinder when the valve timing is such as to reduce the maximum compression pressure, and means for igniting this gaseous charge.

7. In an internal combustion engine of the Diesel type the combination of a plurality of cylinders having inlet and exhaust ports therein, means for injecting liquid fuel into the cylinders, a sleeve valve disposed within each cylinder and adapted to control the ports therein, a short crank shaft adjacent to each sleeve, a crank pin on each short shaft, a flexible connection between the crank pin and the sleeve whereby rotation of the short crank shaft imparts a combined oscillating and reciprocating motion to the sleeve, a skew gear on each short shaft, an engine crank shaft, a single lay shaft, skew gears on the lay shaft meshing respectively with the skew gears on the short crank shafts, an engine crank shaft, an operative driving connection between the engine crank shaft and the lay shaft, means for moving the lay shaft longitudinally so as to vary simultaneously the timing of all the sleeves in relation to the crank shaft whereby the charge compressed within each cylinder on its compression stroke can be reduced at starting, means for cutting off the liquid fuel supply, and an interconnection between the mechanism for moving the lay shaft longitudinally and the means for cutting off the liquid fuel supply so arranged that fuel injection can only take place when the valve timing is such that the engine will operate at its normal working compression.

8. In an internal combustion engine of the Diesel type the combination of a plurality of cylinders having inlet and exhaust ports therein, means for injecting liquid fuel into the cylinders, a sleeve valve disposed within each cylinder and adapted to control the ports therein, a short crank shaft adjacent to each sleeve, a crank pin on each short shaft, a flexible connection between the crank pin and the sleeve whereby rotation of the short crank shaft imparts a combined oscillating and reciprocating motion to the sleeve, a skew gear on each short shaft, an engine crank shaft, a single lay shaft, skew gears on the lay shaft meshing respectively with the skew gears on the short crank shafts, an engine crank shaft, an operative driving connection between the engine crank shaft and the lay shaft, means for moving the lay shaft longitudinally so as to vary simultaneously the timing of all the sleeves in relation to the crank shaft whereby the charge compressed within each cylinder on its compression stroke can be reduced at starting, means for cutting off the liquid fuel supply, an interconnection between the mechanism for moving the lay shaft longitudinally and the means for cutting off the liquid fuel supply so arranged that fuel injections can only take place when the valve timing is such that the engine will operate at its normal working compression, means for supplying an explosive gaseous mixture to the cylinders when the valve timing is such as to reduce the maximum compression pressure, and mean for igniting this mixture.

9. In an internal combustion engine of the Diesel type the combination of a cylinder having inlet and exhaust ports therein, at least one valve controlling these ports, means for injecting a charge of liquid fuel into the cylinder, a crank shaft, mechanism actuated from the crank shaft for operating the valves, means for controlling this mechanism so as to vary the timing of the valves in relation to the crank shaft whereby the charge compressed within the cylinder on each compression stroke can be reduced when starting, means for cutting off the liquid fuel supply, an inter-connection between the means for varying the valve timing and means for cutting off the liquid fuel supply so arranged that fuel injection can only take place when the valve timing is such that the engine will operate at its normal running compression, means for supplying an explosive gaseous mixture to the cylinder when the maximum compression pressure is reduced, and means for igniting this mixture.

10. In an internal combustion engine of the Diesel type the combination of a cylinder having inlet and exhaust ports therein, a sleeve valve disposed within the cylinder and adapted to control the ports therein, a crank shaft, mechanism actuated from the crank shaft for imparting a combined oscillating and reciprocating motion to the sleeve, means for controlling this mechanism so as to vary the timing of the sleeve in relation to the crank shaft whereby the charge compresses within the cylinder on each compression stroke can be reduced when starting the engine, a starting motor for rotating the crank shaft, a switch controlling this motor, and an interconnection between the switch and the mechanism for controlling the valve timing such that the starting motor is automatically switched off when this mechanism is moved into its full compression position.

11. In an internal combustion engine of the Diesel type the combination of a cylinder having inlet and exhaust ports therein, means for injecting a charge of liquid fuel into the cylinder, a sleeve valve disposed within the cylinder and adapted to control the ports therein, a crank shaft, mechanism actuated from the crank shaft for imparting a combined oscillating and reciprocating motion to the sleeve, means for controlling this mechanism so as to vary the timing of the sleeve in relation to the crank shaft whereby the charge compressed within the cylinder on each compression stroke can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, a starting motor for rotating the crank shaft, a switch controlling this motor and an inter-connection between the switch and the mechanism for controlling the valve timing such that the starting motor is automatically switched off when this mechanism is moved into its full compression position.

12. In an internal combustion engine of the Diesel type the combination of a cylinder having inlet and exhaust ports therein, a sleeve valve disposed within the cylinder and adapted to control these ports, means for injecting a charge of liquid fuel into the cylinder, a crank shaft, mechanism actuated from the crank shaft for operating the sleeve valve, means for controlling this mechanism so as to vary the timing of the sleeve in relation to the crank shaft whereby the charge compressed within the cylinder on each compression stroke can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, a starting motor for rotating the crank shaft, a switch controlling this motor, and an interconnection between the switch and the mechanism for controlling the valve timing such that the starting motor is automatically switched off when this mechanism is moved into its full compression position.

13. In an internal combustion engine of the Diesel type the combination of a cylinder having inlet and exhaust ports therein, a sleeve valve disposed within the cylinder and adapted to control these ports, means for injecting a charge of liquid fuel into the cylinder, a crank shaft, mechanism actuated from the crank shaft for operating the sleeve valve, means for controlling this mechanism so as to vary the timing of the sleeve in relation to the crank shaft whereby the charge compressed within the cylinder can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, means for supplying an explosive gaseous mixture to the cylinder when the mechanism controlling the valve timing is in its reduced compression position, means for igniting this mixture, a starting motor for rotating the crank shaft, a switch controlling this motor, and an interconnection between the switch and the mechanism for controlling the valve timing such that the starting motor is automatically switched off when this mechanism is moved into its full compression position.

14. In an internal combustion engine of the Diesel type the combination of a plurality of cylinders having inlet and exhaust ports therein, means for injecting liquid fuel into the cylinders, a sleeve valve disposed within each cylinder and adapted to control the ports therein, a short crank shaft adjacent to each sleeve, a crank pin on each short shaft, a flexible connection between the crank pin and the sleeve whereby rotation of the short crank shaft imparts a combined oscillating and reciprocating motion to the sleeve, a skew gear on each short shaft, an engine crank shaft, a single lay shaft, skew gears on the lay shaft meshing respectively with the skew gears on the short crank shafts, an engine crank shaft, an operative driving connection between the engine crank shaft and the lay shaft, means for moving the lay shaft longitudinally so as to vary simultaneously the timing of all the sleeves in relation to the crank shaft whereby the charge compressed within each cylinder on its compression stroke can be reduced at starting, means for cutting off the liquid fuel supply, an interconnection between the mechanism for moving the lay shaft longitudinally and the means for cutting off the liquid fuel supply so arranged that fuel injection can only take place when the valve timing is such that the engine will operate at its normal working compression, means for supplying an explosive gaseous mixture to the cylinders when the valve timing is such as to reduce the maximum compression pressure, means for igniting this mixture, a starting motor for rotating the crank shaft, a switch controlling this motor, and an interconnection between the switch and the mechanism for controlling the valve timing such that the starting motor is automatically switched off when this mechanism is moved into its full compression position.

15. In an internal combustion engine of the Diesel type the combination of a cylinder having inlet and exhaust ports therein, a sleeve valve disposed within the cylinder and adapted to control these ports, a crank shaft, mechanism actuated from the crank shaft for imparting combined oscillating and reciprocating motion to the sleeve, means for controlling this mechanism whereby part of the charge drawn into the cylinder on the induction stroke is forced out again at the beginning of the compression stroke and the maximum compression pressure thus reduced, means for supplying an explosive gaseous mixture to the cylinder when the maximum compression pressure is thus reduced, means for igniting this gaseous mixture and means for automatically cutting off the supply of gaseous mixture to the cylinder when the mechanism controlling the valve timing is moved into its full compression position.

16. In an internal combustion engine of the Diesel type the combination of a cylinder having inlet and exhaust ports therein, means for injecting a charge of liquid fuel into the cylinder, a sleeve valve disposed within the cylinder and adapted to control the ports therein, a crank shaft, mechanism actuated from the crank shaft for imparting a combined oscillating and reciprocating motion to the sleeve, means for controlling this mechanism so as to vary the timing of the sleeve in relation to the crank shaft whereby the charge compressed within the cylinder on each compression stroke can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, means for supplying an explosive gaseous mixture to the cylinder when the mechanism controlling the valve timing is in its reduced compression position, means for igniting this gaseous mixture, and means for automatically cutting off the supply of gaseous mixture to the cylinder when the mechanism controlling the valve timing is moved into its full compression position.

17. In an internal combustion engine of the Diesel type the combination of a cylinder having inlet and exhaust ports therein, a sleeve valve disposed within the cylinder and adapted to control these ports, means for injecting a charge of liquid fuel into the cylinder, a crank shaft, mechanism actuated from the crank shaft for operating the sleeve valve, means for controlling this mechanism so as to vary the timing of the sleeve in relation to the crank shaft whereby the charge compressed within the cylinder can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, means for supplying an explosive gaseous mixture to the cylinder when the mechanism controlling the valve timing is in its reduced compression position, means for igniting this mixture, and means for automatically cutting off the supply of gaseous mixture to the cylinder when the mechanism controlling the valve timing is moved into its full compression position.

18. In an internal combustion engine of the Diesel type the combination of a cylinder having inlet and exhaust ports therein, at least one valve controlling these ports, a crank shaft, mechanism actuated from the crank shaft for operating the valves, means for controlling this mechanism so as to vary the timing of the valves in relation to the crank shaft whereby the charge compressed within the cylinder on each compression stroke can be reduced when starting, means for supplying a gaseous explosive mixture to the cylinder when the mechanism controlling the valve timing is in its reduced compression position, means for igniting this mixture, and means for automatically cutting off the supply of gaseous mixture to the cylinder when the mechanism controlling the valve timing is moved into its full compression position.

19. In an internal combustion engine of the Diesel type the combination of a cylinder having inlet and exhaust ports therein, at least one valve controlling these ports, means for injecting a charge of liquid fuel into the cylinder, a crank shaft, mechanism actuated from the crank shaft for operating the valves, means for controlling this mechanism so as to vary the timing of the valves in relation to the crank shaft whereby the charge compressed within the cylinder on each compression stroke can be reduced when starting, means for cutting off the liquid fuel supply, an interconnection between the means for varying the valve timing and the means for cutting off the liquid fuel supply so arranged that fuel injection can only take place when the valve timing is such that the engine will operate at its normal running compression, means for supplying an explosive gaseous mixture to the cylinder when the maximum compression pressure is reduced, means for igniting this mixture, and means for automatically cutting off the supply of gaseous mixture to the cylinder when the mechanism controlling the valve timing is moved into its full compression position.

20. In an internal combustion engine of the Diesel type the combination of a cylinder having inlet and exhaust ports therein, a sleeve valve disposed within the cylinder and adapted to control these ports, means for injecting a charge of liquid fuel into the cylinder, a crank shaft, mechanism actuated from the crank shaft for operating the sleeve valve, means for controlling this mechanism so as to vary the timing of the sleeve in relation to the crank shaft whereby the charge compressed within the cylinder can be reduced at starting, means for cutting off the liquid fuel supply, an interconnection between the mechanism for varying the valve timing and that for cutting off the liquid fuel supply so arranged that fuel injection can only take place when the valve timing is such that the engine will operate at its normal running compression, means for supplying an explosive gaseous mixture to the cylinder when the mechanism controlling the valve timing is in its reduced compression position, means for igniting this mixture, means for automatically cutting off the supply of gaseous mixture to the cylinder when the mechanism controlling the valve timing is in its full compression position, a starting motor for rotating the crank shaft, a switch controlling this motor and an interconnection between this switch and the mechanism controlling the valve timing such that the starting motor is automatically switched off when this mechanism is moved into its full compression position.

In testimony whereof I have signed my name to this specification.

HARRY RALPH RICARDO.